Dec. 10, 1968   C. E. ADLER   3,416,151
INDICATING APPARATUS

Filed Dec. 7, 1964   5 Sheets-Sheet 1

INVENTOR.
CLARENCE E. ADLER
BY
Thomas H. Grafton
ATTORNEY

Dec. 10, 1968  C. E. ADLER  3,416,151
INDICATING APPARATUS
Filed Dec. 7, 1964  5 Sheets-Sheet 3

INVENTOR.
CLARENCE E. ADLER
BY
Thomas H. Grafton
ATTORNEY

United States Patent Office 3,416,151
Patented Dec. 10, 1968

3,416,151
INDICATING APPARATUS
Clarence E. Adler, Toledo, Ohio, assignor, by mesne assignments, to The Reliance Electric and Engineering Company, Toledo, Ohio, a corporation of Ohio
Filed Dec. 7, 1964, Ser. No. 416,526
19 Claims. (Cl. 340—347)

This invention relates to numerical display devices for displaying results produced by electronic counters or the like.

The objects of the invention are to improve numerical display devices, to simplify the construction of such devices, to increase the ruggedness of such devices, to set-up closely spaced print wheels with such devices, to increase the precision and the reliability of such devices, and to improve components of such devices such as the drive mechanisms, commutators and slip clutches.

One embodiment of this invention enabling the realization of these objects is a combination of a series of modules each comprising a detent wheel which is directly gear connected to a commutator and to a print wheel. Each module indicates the digits of a particular denominational order and is of unit construction, so that the modules each can be readily removed as a unit to be serviced or to be replaced. When the turning print wheel approaches the correct indicating position, a stopping latch intercepts the correct one of the teeth of the detent wheel to arrest the detent wheel and thus the print wheel in a manner resembling the way in which the stopping latches stop the toothed wheels disclosed in the numerical display device with solenoid controlled tooth interception shown in U.S. Patent No. 3,147,470 issued Sept. 1, 1964 to R. E. Bell and R. C. Loshbough.

The print wheels are small in order to fit into a compact printing station and a 2:1 gear ratio is provided between the detent wheel and the print wheel so that the detent wheel is large enough to be molded easily, to distribute the wear over twice as many teeth as there would be with a 1:1 ratio, and to make the teeth and the stopping pawls relatively large and thus strong. The commutator is a dual commutator to fit into this design, such commutator needing only one-half revolution or less to produce a readout.

The drive is provided through slip clutches in the detent wheels which turn the detent wheels until they are stopped by the stopping pawls, the clutches being of a drum type that ensures reliable operation.

In accordance with the above, one feature of this invention resides in directly gear connecting the detent wheel to the commutator and to the print wheel. The direct gearing permits the print wheels to be positioned close together so that printed numbers are close together.

Another feature resides in the multiple commutator which has a set of brushes for each commutator pattern for high reliability, i.e., since either contact closure produces an output, dirt under one brush will not cause failure.

Still another feature resides in the other than 1:1 gear ratio between the detent wheel and the print wheel and the number of duplications of commutator patterns being equal to such gear ratio. This permits the 2:1 gear ratio between such wheels to allow small print wheels (compact printing station) and large detent wheels (molded easily, large and strong).

A further feature resides in the design of the clutches which are of a drum type each having four flexure spring plates that ensure reliable operation. The clutches are not critical in assembly or maintenance; no adjustment is required in assembly or with wear.

The above and other objects and features of this invention will be appreciated more fully from the following detailed description when read with reference to the accompanying drawings wherein.

Figure 9:
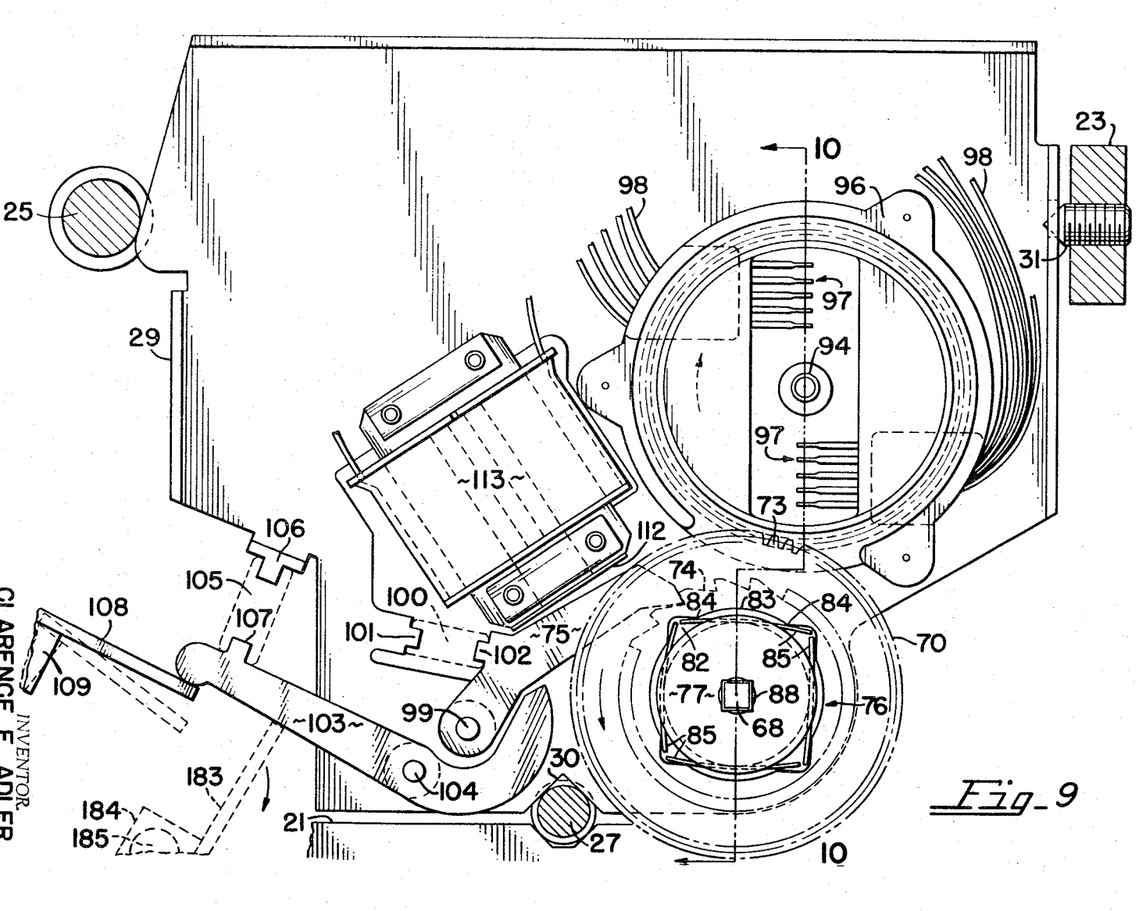
FIG. 9 is an enlarged, vertical sectional view taken along the line 9—9 of FIG. 3.
Figure 10:
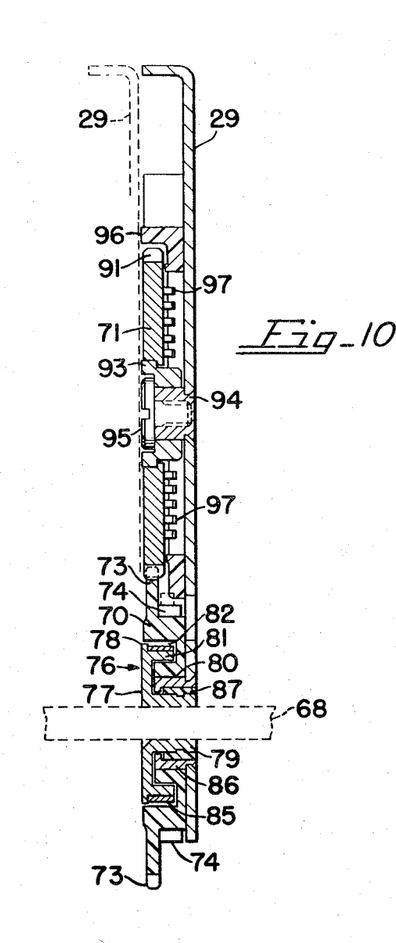
FIG. 10 is a vertical, sectional view taken along the line 10—10 of FIG. 9.

Referring to the drawings, the numerical display or readout device is constructed on a base 20 supporting two spaced-apart, elongated blocks 21 and two side plates 22. The side plates 22 are joined together by means including a flat block 23 at the upper front end of the device, screws 24 (one shown in FIG. 4) extending through the plates 22 and threaded into the block 23 holding the plates and the block together, a circumferentially grooved upper rod 25 at the upper rear end of the device, nuts 26 on shouldered, threaded ends of the rod holding the plates and the rod together, and a circumferentially grooved lower rod 27 at the bottom end of the device, screws 28 (FIG. 5) extending through the rod and threaded into the blocks 21 securing the rod in grooves in such blocks. The complete device comprises a plurality of duplicate subassemblies of unit construction, one for each place in the number to be indicated. The unit construction of each subassembly or module permits it to be readily removed to be serviced or replaced. Each module has all of its working parts mounted on a module plate 29 which in connected in the display device by moving it vertically, downwardly until a notch 30 (FIG. 9) in the plate 29 is received in one of the circumferential grooves in the lower rod 27 and until the back end of the plate 29 is received in one of the circumferential grooves in the upper rod 25. A set screw 31 (FIGS. 3 and 9) threaded through the block 23 holds the module plate 29 in place. A module plate 29 is shown in operative position in FIGS. 3, 5 and 9. FIG. 10 shows a module plate 29 in full lines and another in broken lines to illustrate the closeness of juxtaposed modules. One of the features of the device resides in the closeness of the numbers printed by the device and the overall compactness of the device itself.

Figures 3, 6, 7:
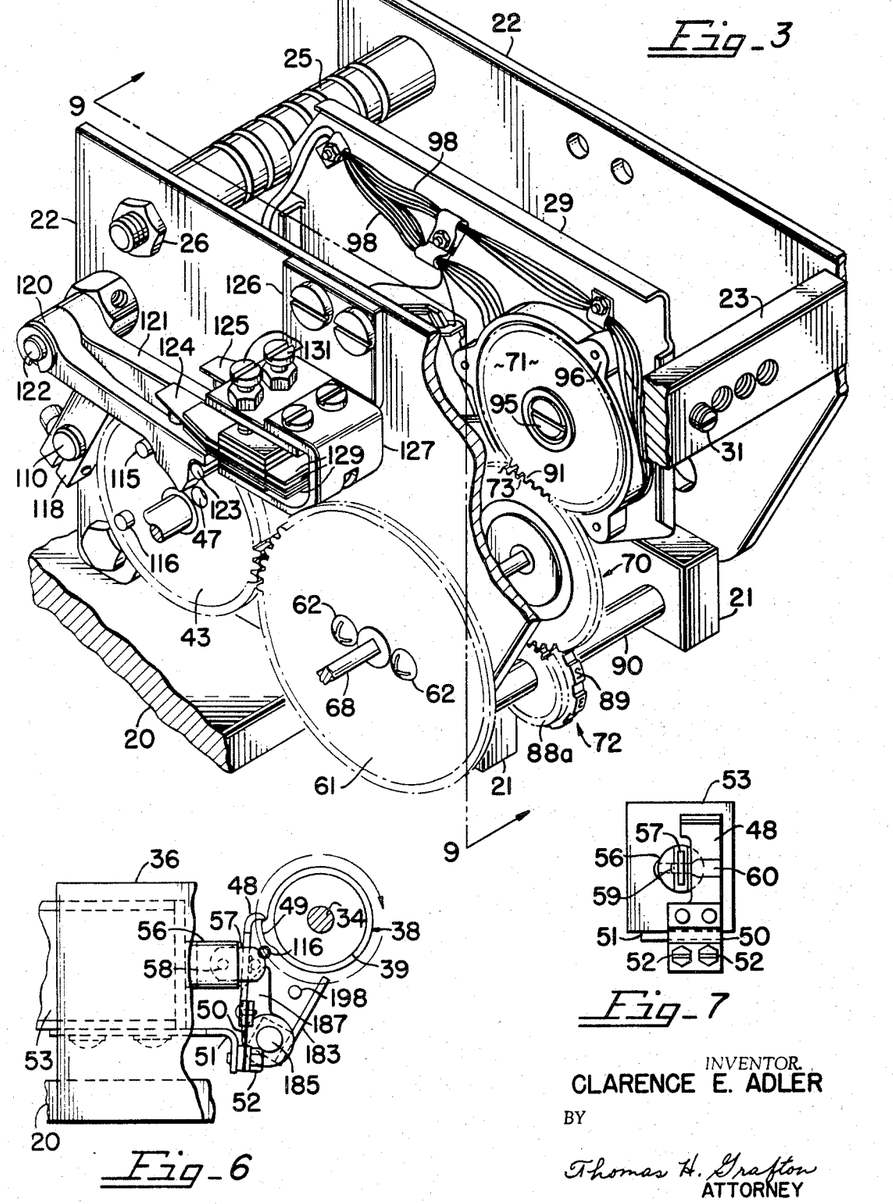
FIG. 3 is a fragmentary perspective view of the numerical display device showing one module of unit construction in place which indicates the digits of a particular denominational order.
FIG. 6 is a reduced, fragmentary elevational view as seen looking toward the bottom end of the device as viewed in FIG. 4.
FIG. 7 is a fragmentary elevational view as seen looking toward the left hand side of the device as viewed in FIG. 6.
Figure 4:
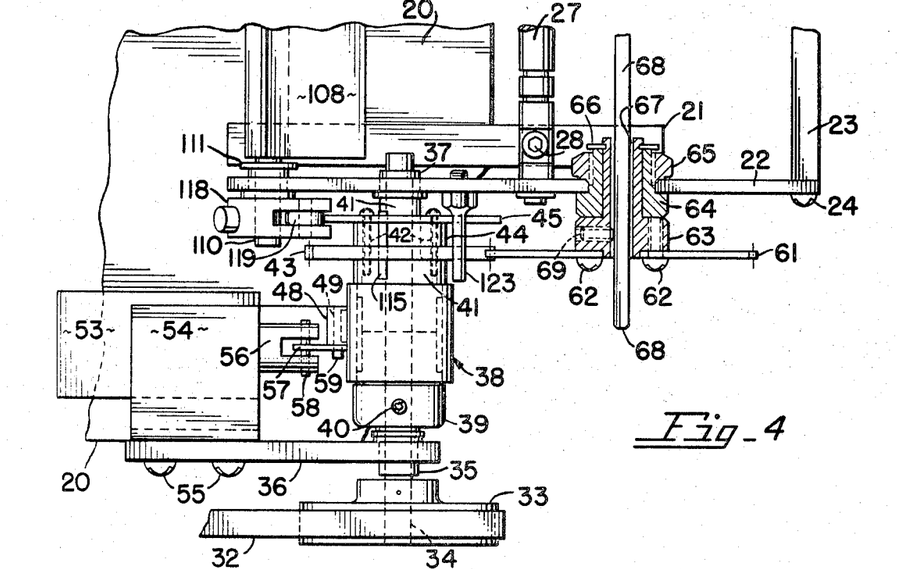
FIG. 4 is a fragmentary plan view of the device shown in FIG. 3.

The numerical display device is driven by a continuously moving belt 32 that drives a pulley 33 fixed on a shaft 34 which is journaled in a bearing 35 in a vertical plate 36 on the base 20 and in a bearing 37 in that one of the side plates 22 shown in FIG. 4. The shaft 34 drives a one-revolution clutch 38 having a continuously rotatable end 39 fixed to the shaft 34 by means of a set screw 40 and a one-revolution hub 41 to which, by means of screws 42, are attached a gear 43, a spacer 44 and a cam 45, such screws 42 extending through holes 46 (FIG. 8) in the cam 45 and through holes 47 in the gear 43 (one hole 47 shown in FIG. 3). The gear 43 and the cam 45 are turned 360 degrees whenever a pawl finger 48 is removed from its position shown in FIGS. 4, 6 and 7 wherein it is in the path of a step 49 on the clutch 38. A similar acting pawl finger 48 and one-revolution clutch 38 are shown in FIG. II in the above U.S. Patent No. 3,147,470. The pawl finger 48 is pivotally mounted by means of a flexure spring 50 which urges the free end of the finger 48 toward the clutch, the flexure spring 50 being secured to a bracket 51 by means including two screws 52. The bracket 51 is carried by a solenoid 53 which in turn is carried by a bracket 54 connected to the vertical plate 36 by means of screws 55. The plunger 56 of the solenoid 53 is connected to the pawl finger 48 by means of a link 57 which is pivotally mounted between bifurcations of the plunger 56 by means of a pin 58 and is pivotally mounted on a pin 59 having a flattened end 60 (FIG. 7) fixed to the pawl finger 48. Energization of the solenoid 53 by a start signal or pulse withdraws the pawl finger 48 from the step 49 and the cam 45 are turned clockwise through one revolution as indicated by the curved arrows in FIGS. 6 and 8 about the axis of the shaft 34. Deenergization of the solenoid 53 allows the flexure spring 50 to move the pawl finger 48 into the path of the step 49 stopping the gear 43 and the cam 45 after one revolution.

The gear 43 meshes with a gear 61 attached by means of screws 62 (FIGS. 3 and 4) to a hub 63 which is rotatable in a bearing 64 that is held on that one of the side plates 22 shown in FIG. 4 by means of a nut 65, a C-clip 66 retaining the hub 63 in the bearing 64. The hub 63 defines a square hole 67 which receives a square shaft 68 that is fixed in the hub 63 for rotation therewith by means of a set screw 69. The square shaft 68 functions to drive the working parts on the module plates 29 as hereinafter described. Because of the gear ratio between the gears 43 and 61, the gear 61 turns 252 degrees for every 360 degree turn of the gear 43.

The modules or duplicate subassemblies each includes a detent wheel 70 which is directly gear connected to a dual commutator 71 and to a print wheel 72 (FIG. 3). The detent wheel 70 is formed of one molded piece having a gear portion 73 (FIGS. 3, 9 and 10) and twenty-four teeth 74 (FIGS. 9 and 10) which cooperate with a stopping latch pawl 75 as shown in FIG. 9. The detent wheel 70 is driven by the square shaft 68 through a clutch 76. The clutch 76 is a slip clutch having a drum 77 on the square shaft 68 and which defines a flange 78, the drum having a hub portion 79 received in a hole 80 in the detent wheel 70 and a friction portion 81 received in a generally square opening 82 in the detent wheel. As shown in FIG. 9, the square shaft 68 is received in a generally square hole 88 in the drum 77 so that the shaft 68 and the drum 77 turn together as one. As also shown in FIG. 9, the generally square opening 82 in the detent wheel is provided with partially curved sides 83 forming two sharp edges 84 in each side of the generally square opening 82. The clutch 76 also includes four flexure spring plates 85 one along each of the four sides of the generally square opening 82 with the friction drum portion 81 receiving the flexure plates 85 and the flange 78 of the drum 77 retaining the flexure plates 85 in the generally square opening 82. The sharp edges 84 bow the flexure plates 85 over the friction portion 81 of the drum 77. In operation, when the stopping latch pawl 75 is withdrawn from the teeth 74, the square shaft 68 drives the detent wheel 70 through the clutch 76, there being enough friction between the flexure plates 85 and the drum 77 to make the drum 77 and the detent wheel 70 turn together as one. However, when the stopping latch pawl 75 engages a tooth 74 of the detent wheel 70, the flexure plates 85 slip on the drum and the detent wheel 70 is stationary while the drum turns. The detent wheel 70 turns on a bearing 86 in the form of a stationary hollow stud in the plate 29 and the drum 77 is provided with a retaining ring 87 which limits movement of the drum 77 to the left as viewed in FIG. 10.

The clutch 76 is one of the features of the device. The flexure springs 85 provide constant friction in each module and require no adjustment during assembly or for wear, i.e., there is nothing critical in assembly or maintenance. The improved clutch 76 ensures reliable operation of the friction drive, the clutch having superior simplicity. The print wheel 72 is a rotatable element to be positioned according to information in an electrical circuit (hereinafter described, see FIGS. 1 and 2), such electrical circuit including the rotatable commutator 71, and the detent wheel is a slip-clutch driven toothed-member directly gear connected to the rotatable element and to the commutator for driving them. The latch pawl 75 is part of stopping means, described hereinafter, which is controlled by the electrical circuit and is engageable with the teeth on the toothed-member for stopping the print wheel 72 in the position corresponding to the information.

The module is removed from the readout device as a unit assembly by loosening the set screw 69 (FIG. 4), withdrawing the square shaft 68 from the generally square opening 88 (FIG. 9) in the drum 77, loosening the set screw 31 (FIGS. 3 and 9) and lifting the module plate 29 out of the readout device.

The gear portion 73 of the detent wheel 70 meshes with a gear 88a (FIG. 3) on the side of the print wheel 72, bearing printing type 89, mounted for rotation on a stationary shaft 90 extending between the blocks 21. The print wheel 72 turns twice for each turn of the detent wheel 70 (2:1 ratio) and has twelve printing positions.

Figure 1:
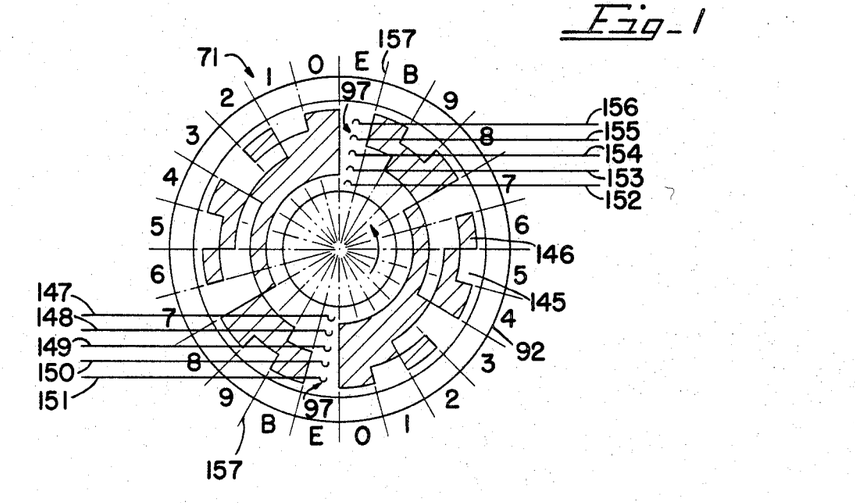
FIG. 1 is a diagram of brushes and a dual commutator having two duplications of commutator patterns used in a circuit controlling the indication of a count.

The gear portion 73 of the detent wheel 70 also meshes with a gear 91 (FIGS. 3 and 10) on the dual commutator 71, the commutator consisting of a single flat metal plate having the double function (one of the features of the readout device) of being formed with gear teeth on its periphery and having the commutator electrical pattern 92 shown in FIG. 1, the pattern 92 being separated from the metal plate by a layer or coating of epoxy resin. The commutator 71 si shown removed from the module in FIG. 9 to reveal the structure behind it. However, in the section shown in FIG. 10 which is taken along the line 10—10 in FIG. 9, the commutator 71 is shown incorporated in the module. The commutator electrical pattern shown in FIG. 1 is on the back of the commutator 71 as viewed in FIG. 3 concealed from view. The commutator flat plate is provided with a hub 93 which is rotatable on an internally threaded stationary stud 94 in the module plate 29, there being a screw 95 received in the internally threaded stud holding the hub 93 in place. The commutator 71 is located in a housing 96 secured to the module plate 29 which functions to support a double set of brushes 97 which are molded for support in the housing 96. Leads 98 for the brushes are shown in FIGS. 3 and 9. When the commutator is in place as shown in FIG. 10, the brushes 97 contact the electrical pattern 92 (FIG. 1) and are positioned relative to the pattern as shown in FIG. 1. The same results are obtained by rotating either the commutator or the brushes.

The modules or duplicate subassemblies also each includes the stopping latch pawl 75 which is pivoted to the module plate 29 at 99 and is urged about the axis of such pivot by a coil spring 100, extending between a projection 101 on the plate 29 and a projection 102 on the pawl 75, clockwise toward the detent wheel teeth 74. A reset finger 103 is pivoted at 104 to the module plate 29 and is urged about the axis of such pivot by a coil spring 105, extending between a projection 106 on the plate 29 and a projection 107 on the finger 103, counterclockwise toward the latch pawl 75. A reset lever 108, which is carried on a square portion 109 of a shaft 110 having round ends journaled in bearings 111 in the side plates 22, moves from its solid line position shown in FIG. 9 down to its broken line position shown in FIG. 9 and then immediately back up to such solid line position at the beginning of each cycle to reset the latch pawls 75 on all of the duplicate subassemblies. When the reset lever 108 is in its down position, the spring 105 pivots the reset finger 103 counterclockwise into engagement with the latch pawl 75, overcomes the force of the spring 100, and pivots the latch pawl 75 counterclockwise in opposition to its spring 100 into engagement with the core 112 of a solenoid 113 carried by the module plate 29. As described hereinafter, the solenoid 113 is energized at this point in the cycle and holds the latch pawl 75 up out of engagement with the detent wheel teeth 74 when the reset lever 108 moves back to its solid line position shown in FIG. 9 moving the reset lever clockwise in opposition to its spring 105 out of engagement with the latch pawl 75. When the detent wheel 70 approaches the position at which it is to stop as hereinafter described, the solenoid 113 is deenergized and the spring 100 pivots the latch pawl clockwise about its pivot 99 into stopping engagement with one of the twenty-four teeth 74.

Figure 5:
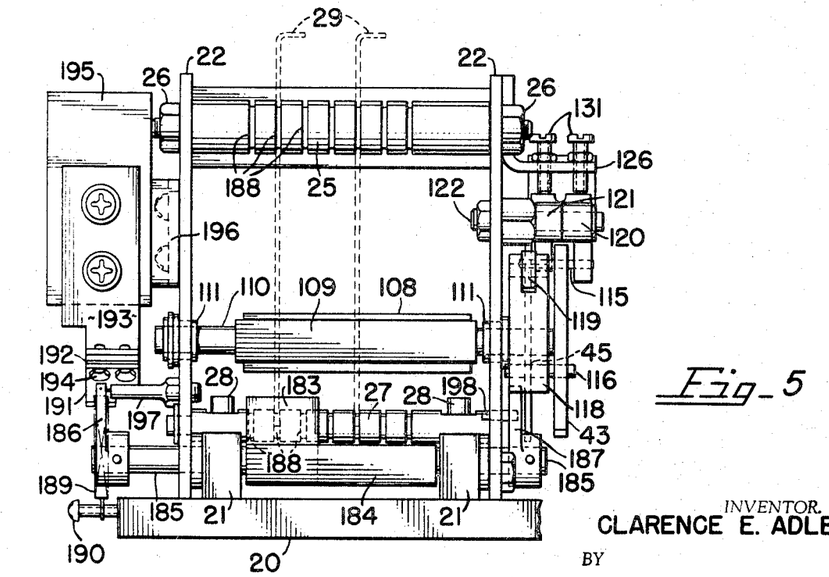
FIG. 5 is a fragmentary rear elevational view of the device shown in FIG. 3.
Figure 8:
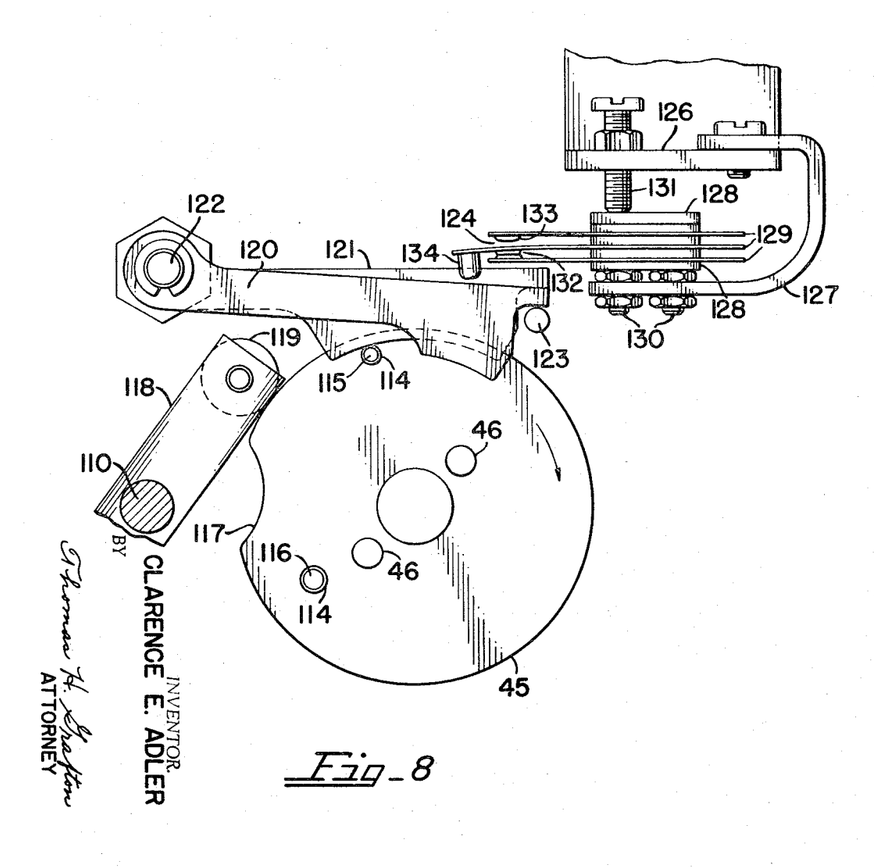
FIG. 8 is an enlarged, fragmentary elevational view as seen looking toward the end of the device as viewed in FIG. 3.

The reset lever 108 is driven by the cam 45 which as indicated by the curved arrow in FIG. 8 is rotated clockwise one revolution per readout cycle. The cam 45 has two holes 114 which receive pins 115 and 116 which are pressed into and carried by the gear 43. Pin 115 is shown in FIGS. 4 and 5 extending on either side of the gear 43 with an end extending through the cam 45. Pin 116 is shown in FIG. 5 extending for the most part to the left from the gear 43 and extending through the cam 45. Both pins 115 and 116 can be seen in perspective in FIG. 3. Th cam 45 is round except for a depression 117. The shaft 110 carries a bifurcated member 118 which carries in turn a cam-following roller 119 between its bifurcations. The roller 119 follows the cam 45. The cam 45 is shown in its home position in FIG. 10. An instant after the cam 45 starts rotating, the roller 119 moves down into the cam depression 117 causing the rest lever 108 to move from its solid line position to its broken line position shown in FIG. 9 and then soon moves back into its original position as the cam depression 117 passes by to return the reset lever 108 to its solid line position, i.e., the reset lever 108 as viewed in FIG. 9 quickly moves down and then back up at the beginning of every readout cycle, and the stopping latch pawls 75 are moved away from the detent wheel teeth 74 and up against the energized solenoid cores 112. Spring 105 holds the roller 119 on the cam 45.

The pin 115 functions to drive the switch operating levers 120 and 121 which are pivotally mounted side by side on a stud 122 extending horizontally from one of the end plates 22. Normally the free ends of the levers 120 and 121 rest under the influence of gravity on a stop 123 extending from the end plate 22. The levers 120 and 121 operate contacts 124 and 125, respectively. The contacts 124 and 125 are mounted from the end plate 22 by means of an angle bracket 126 which carries a split bracket 127 (split shown in FIG. 3) that carries in turn two stacks of alternating insulating elements 128 and spring flexures 129, screws 130 holding such stacks on the split bracket 127. Adjustment screws 131 function to move either one of the stacks of alternating insulating elements 128 and spring flexures 129 up or down relative to the levers 120 and 121 by bending the split portions of the bracket 127. The contacts 124 and 125 are mounted on the ends of the spring flexures 129, the middle ones of the three flexures 129 in each stack carrying members 134 which are engaged by the levers to operate the contacts. Contacts 124 and 125 are identical, only contacts 124 being shown in FIG. 8. Each set of contacts includes bottom closures 132 and top closures 133. When the bottom closures 132 are closed, as shown in FIG. 8, there is an open circuit, but, when the top closures 133 are closed, there is a closed circuit. The pin 115 which extends on either side of the gear 43 drives both of the levers 120 and 121, the lever 120 being located to the right of the gear 43 as viewed in FIG. 5 and the lever 121 being located between the gear 43 and the cam 45.

Figure 2:
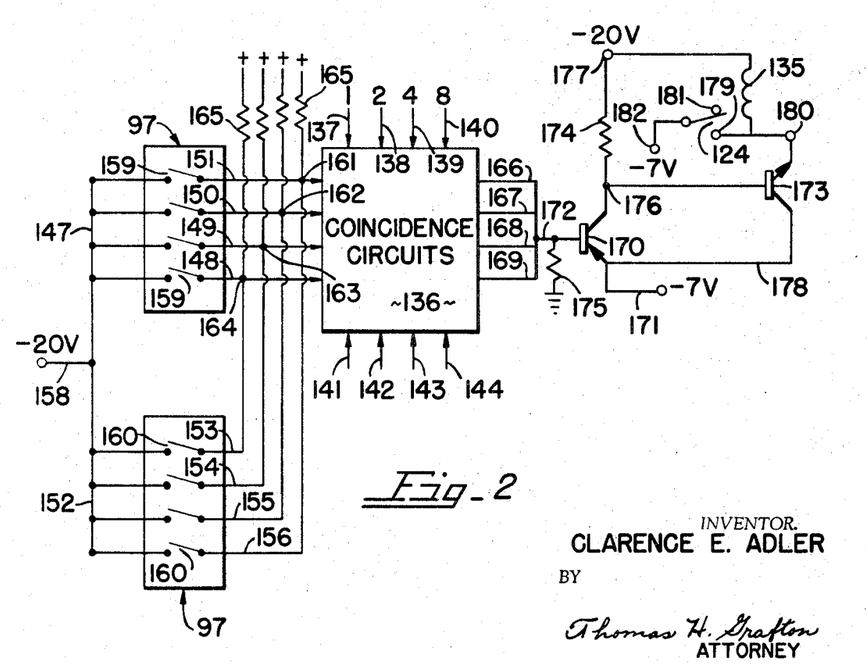
FIG. 2 is a schematic diagram of the circuit controlling the indication of a count.

When the cam 45 is in its home position (FIG. 8), the pin 115 holds lever 121 up which engages its member 134 (not shown) to close its closures 133 (not shown) indicating that the readout cycle has been completed. This signal is useful as an input to a check circuit, but does not enter into the operation of the readout circuits shown in FIG. 2. When the cam 45 is in its home position, the pin 115 does not engage lever 120 and it rests upon the stop 123 as shown in FIG. 8. An instant after the cam 45 starts rotating, the pin 115 picks lever 120 up and it engages its member 134 to close its closures 133 of contacts 124 to energize all of the solenoids 113 (one shown in FIG. 9) and then soon moves out of engagement with the lever 120 which returns to its FIG. 8 position, i.e., the back or top contact of contacts 124 is closed only momentarily. The coil 135 of the solenoid 113 is shown in FIG. 2 as is also the top contact of contacts 124. The latch coils 135 (one for each module or subassembly) are energized before the roller 119 reaches the bottom of the cam depression 117.

The signal controlling the indication of a count in an electronic counter is produced by the circuitry shown in FIGS. 1 and 2, the counter being connected to the coincidence circuits 136. However, the inputs applied to the coincidence circuits 136 can be supplied by other electrical circuits, such as flip-flops operated by photocell pulses. An example of a suitable counter is shown in U.S. Patent No. 3,029,352 issued Apr. 10, 1962 to C. E. Marshall. The patent discloses four transistor binary flip-flop stages connected in cascade with added circuits to convert to a count of ten to fill and return to the initial condition (adapted to count according to the decimal system). The four flip-flop flips at counts of 1, 2, 4, and 8, respectively, i.e., a modified binary 1–2–4–8 counter. The counter is so connected to the coincidence circuits 136 that, when the four flip-flops flip, positive inputs are applied to leads 137–140, i.e., there is one lead 137–140 for each output of the flip-flops. Combinations of positive and negative leads 137–140 permit counting in the decimal system 0–9. Auxiliary flip-flop circuits similarly provide the required combinations of positive and negative leads 141–144 to correspond to blank and extra segments of the dual commutator 71.

The following table (Table No. 1) shows the positive or negative condition of the leads 137–140 according to the count:

TABLE 1

| Count | Lead 137 | Lead 138 | Lead 139 | Lead 140 |
|---|---|---|---|---|
| 0 | − | − | − | − |
| 1 | + | − | − | − |
| 2 | − | + | − | − |
| 3 | + | + | − | − |
| 4 | − | − | + | − |
| 5 | + | − | + | − |
| 6 | − | + | + | − |
| 7 | + | + | + | − |
| 8 | − | − | − | + |
| 9 | + | − | − | + |

In addition, leads 141–144 are − − + + for blank (B), respectively, and are + + + + for extra (E), respectively.

The function of the readout device is to position the print wheel 72 in a printing station according to the count in the counter or to "B" or "E" (twelve printing positions).

The dual commutator 71 is provided with the pattern 92 having a conducting surface 145 and an insulated surface 146. The pattern has two identical portions, the right half of the pattern being a duplicate of the left half of the pattern as viewed in FIG. 1. Hence, the commutator 71 needs only one-half a revolution or less to produce a readout. This is in contrast to the single commutator needing possibly a full revolution to produce a readout shown in FIG. VII in the above U.S. Patent No. 3,147,470. One set of stationary brushes 97 is connected to leads 147–151 and the oother set is connected to leads 152–156, both sets being arranged to pick up the same 1–2–4–8 binary coded decimal signals as shown in Table No. 1 above.

The commutator 71 turns counterclockwise as viewed in FIG. 1 and has segment lines 157, which divide the pattern into twenty-four equal segments, two for each number 0–9 to be indicated, two for a blank (B) to be indicated, and two extra ones (E). The two sets of brushes 97 are staggered relative to each other so that each track on different portions of the commutator 71.

The leads 147-156 are shown connected to the coincidence circuits 136 in FIG. 2. Common commutator leads 147 and 152 are joined at the end of a lead 158 which is connected to a minus 20 volts power supply. Leads 148–151 are connected to the common lead 147 through contacts 159 and leads 153–156 are connected to the common lead 152 through contacts 160. Actually, contacts 159 and 160 do not exist but are shown only to illustrate how the commutator electrically connects and disconnects the respective leads. Leads 151 and 156 are joined at terminal 161; leads 150 and 155 are joined at terminal 162; leads 149 and 154 are joined at terminal 163; and leads 148 and 153 are joined at terminal 164. Resistors 165 are connected to such terminals 161–164 to provide positive inputs to the coincidence circuits 136 which correspond to the positive inputs provided by the counter leads 137–140.

The brushes of the common leads 147 and 152 always contact the conducting surface 145. The brushes of the rest of the leads 148–151 and 153–156 contact the conducting surface 145 or the insulated surface 146 depending on the position of the commutator 71. When the brushes 97 are upon the insulated surface 146 (common brushes never on the insulated surface 146), the circuits from the common leads 147 and 152 are broken. This is shown as open contacts 159 and 160 in FIG. 2. When the brushes 97 (common brushes always on the conducting surface 145) are upon the conducting surface 145, the circuits from the common leads 147 and 152 are completed. This closes the respective contacts 159 and 160 in FIG. 2. Opening of contacts 159 in leads 148–151 applies positive inputs from the resistors 165 through the leads 148–151 to the coincidence circuits 136. Opening of contacts 160 in leads 153–156 also applies positive inputs from the resistors 165 through the leads 148–151 to the coincidence circuits 136, because leads 148–151 are joined to leads 156–153, respectively. Closing of contacts 159 in leads 148–151 applies negative inputs from the minus 20 volts power supply (lead 158) through the leads 148–151 to the coincidence circuits 136. Closing of contacts 160 in leads 148–151 applies negative inputs from the mminus 20 volts power supply (lead 158) through the leads 148–151 to the the coincidence circuits 136, because leads 148–151 are joined to leads 156–153, respectively.

The following table (Table No. 2) shows the positive or negative condition of the leads 148–151 (positive or negative inputs to coincidence circuits) according to which of the commutator segments are at the brushes 97.

TABLE 2

| Segments | Leads 151 | Leads 150 | Leads 149 | Leads 148 |
|---|---|---|---|---|
| 0 | + | + | + | + |
| 1 | − | + | + | + |
| 2 | + | − | + | + |
| 3 | − | − | + | + |
| 4 | + | + | − | + |
| 5 | − | + | − | + |
| 6 | + | − | − | + |
| 7 | − | − | − | + |
| 8 | + | + | + | − |
| 9 | − | + | + | − |
| B | + | + | − | − |
| E | − | − | − | − |

Table No. 1 (counts 0–9) and Table No. 2 (segments 0–9) are alike, except the positive and negative input conditions are opposite. Also, the positive and negative input conditions in Table No. 2 for "B" and "E" are like such conditions or leads 141–144. For the sake of simplicity, the following description will ignore readout positions "B" and "E", since an understanding of the invention can be had by an understanding of how the print wheel 72 is positioned according to the count in the counter, i.e., counts 0–9.

There is nothing novel about the coincidence circuits 136, coincidence circuits being shown in U.S. Patent No. 2,892,953, issued June 30, 1959 to E. S. McVey, in U.S. Patent No. 2,930,942 issued Mar. 29, 1960 to S. Levine et al., and on pp. 74 and 75 of the Sept. 14, 1964 "Electronic Design" (vol. 12, No. 19, published by Hayden Publishing Company, Inc.) showing, in an exclusive-or transistor circuit, plus-minus inputs or minus-plus inputs to get a plus output or minus-minus inputs or plus-plus inputs to get a minus output. With four of such of these latter type circuits making up the coincidence circuits 136, the plus and minus inputs on commutator leads 151–148 are matched with the plus and minus inputs on counter leads 137–140, respectively. Any coincidence circuit which matches plus and minus inputs as described above and produces current flow in output leads as described below can be used. When the input on commutator lead 151 is plus and the input on counter lead 137 is minus or vice versa, current flow stops in output lead 166, when the input on commutator lead 150 is plus and the input on counter lead 138 is minus or vice versa, current flow stops in output lead 167, when the input on commutator lead 149 is plus and the input on counter lead 139 is minus or vice versa, current flow stops in output lead 168, and when the input on commutator lead 148 is plus and the input on counter lead 140 is minus or vice versa, current flow stops in output lead 169. Stoppage of current flow in all of the output leads 166–169 indicates coincidence. If there is current flow in any one of the output leads 166–169, coincidence does not exist. This means, for example, that if the count in the counter is three (+ + − − inputs, see Table No. 1) coincidence occurs when the commutator segments 3 are at the brushes 97 (− − + + inputs, see Table No. 2).

If there is current flow in output lead 166 or 167 or 168 or 169 (not at coincidence), then there is current flow in a PNP transistor 170 which has its emitter connected to a minus 7 volts power supply through a lead 171, its base connected to the leads 166–169 through a lead 172, and its collector connected to the base of an NPN transistor 173 and to a resistor 174. A resistor 175 is connected between the lead 172 and ground. When the PNP transistor 170 is on, terminal 176 connected to the collector of the transistor comes to minus 7 volts, the same as that of the power supply on the lead 171. The resistor 174 and the coil 135 are connected to a minus 20 volts power supply connected to a terminal 177, the coil 135 also being connected to the emitter of the NPN transistor 173, and the collector of the NPN transistor 173 is connected through a lead 178 to the emitter of the PNP transistor 170. The contact 124 when closed engages a terminal 179, connected to a terminal 180 between the coil 135 and the emitter of the transistor 173, and when open engages a dead terminal 181, the contact 124 being connected to a minus 7 volts power supply on a terminal 182. When the PNP transistor 170 is on, the NPN transistor 173 also is on because the base of the transistor 173 (connected to minus 7 volts terminal 176) is more positive than the emitter of the transistor 173 (connected to minus 20 volts terminal 177) and current flows through the coil 135, i.e., the solenoid 113 (FIG. 9) is energized. Thus, the solenoid 113 is energized when coincidence does not exist and is deenergized when coincidence exists (no current flow in any of output leads 166–169—transistors 170 and 173 off—no current flow in coil 135).

In operation, to make a new reading the solenoid 53 is energized long enough to withdraw the pawl finger 48 from the clutch step 49 and the gear 43 and the cam 45 are turned through one revolution. Gear 43 drives gear 61 through 252 degrees. An instant after the cam 45 starts rotating, the cam following roller 119 moves down into the cam depression 117 causing the reset lever 108 to move down and then back up as shown in FIG. 9 and the latch pawls 75 are driven away from the detent wheel teeth 74 and up against the solenoid cores 112 to reset the readout device, the solenoids 113 being energized at this time because the latch coils 135 are energized by the action of the pin 115 (FIG. 8) engaging the lever 120 and closing the back or top contact of contacts 124 (see FIG. 2) before the cam following roller 119 reaches the bottom of the cam depression 117. The detent wheel 70 remains stationary while its clutch 76 slips for about the distance of one detent tooth 74 before the latch pawl 75 is reset. The energized solenoids 113 hold the latch pawls 75 up out of engagement with the detent wheel teeth 74. Closing of such back or top contact of contacts 124, which is only momentary, connects the minus 7 volts power supply at the terminal 182 (FIG. 2) to the latch coils 135, the coil 135 (only one shown in FIG. 2, but there is one for every readout module or subassembly) being kept energized by current flow through the transistors 170 and 173 due to no coincidence between the count in the counter and the position of the commutator 71 as detected by the coincidence circuits 136.

The above rotation of the gear 61 through 252 degrees rotates the square shaft 68, which drives the detent wheel clutch 76, an equal amount. The gear ratio between the gears 73 and 91 of the detent wheel 70 and of the commutator 71, respectively, is 1:1. However, the gear ratio between such gear 73 and the gear 88a on the print wheel 72 is 2:1. The direct gearing keeps the commutator 71 and the print wheel 72 synchronized, the printing type 89 on the print wheel corresponding exactly to the segments of the commutator 71 (twenty-four commutator segments and twenty-four detent wheel teeth 74), i.e., for example, when the "2" commutator segments are at the brushes 97, the "2" printing type is located in a printing station ready for printing to be accomplished. Because of the dual commutator pattern, only one-half revolution or less of the commutator 71 is required for a readout, but, because of the above 2:1 gear ratio, such one-half revolution of the commutator produces a full revolution of the print wheel 72. Of course, less than one-half revolution of the commutator can produce a readout depending on how soon the count in the counter and the commutator segments agree. As the print wheel or rotatable member 72 which is to be positioned according to information in the counter approaches the position corresponding to the information, the coincidence circuits 136 detect coincidence between the commutator position and the count in the counter and all current flow stops in output leads 166–169 and thus in the transistors 170 and 173 and in the coil 135 to deenergize the solenoid 113 (FIG. 9). Deenergization of the solenoid 113 permits the coil spring 100 to pivot the stopping latch pawl 75 into engagement with the proper one of the twenty-four teeth 74, stopping the detent wheel 70 and thus the commutator 71 and the print wheel 72 in positions wherein the print wheel 72 is positioned in the printing station corresponding to the count in the counter. After the detent wheel 70 is stopped, its clutch drum 77 continues to turn until the square shaft 68 and its gear 61 have accomplished their 252 degree turn. The readout device includes a series of modules each having a print wheel that indicates the digits of a particular denominational order.

Another of the features of the readout device resides in the directly gear connected detent wheel 70, commutator 71 and print wheel 72. This direct gearing permits the print wheels to be positioned close together so that the numbers are printed close together and produces a readout device having superior simplicity.

Another feature resides in the 2:1 gear ratio between the detent wheel 70 and the print wheel 72. This permits a relatively small print wheel to fit into a compact printing station and a relatively large detent wheel which because it is large is molded easily, distributes its wear over twice as many teeth 74 as there would be with a 1:1 ratio, is strong, and permits the stopping latch pawls 75 to be relatively large and thus strong. The commutator 71 is a dual commutator to fit into this design, such a commutator needing only one-half revolution or less to produce a readout. Accordingly, the above gear ratio between the detent wheel and the print wheel and the number of duplications of commutator patterns correspond.

Still another feature resides in the multiple commutator 71 which has a set of brushes 97 for each commutator pattern for high reliability, i.e., since either contact set closure produces an output, dirt under one brush does not cause failure. As shown in FIG. 2, the respective brushes 97 are connected at terminals 161–164. If one set of brushes is at a "3" commutator segment, for example, the other set of brushes is at the other "3" commutator segment. Since the brushes are connected as shown in FIG. 2, whether both brush sets are operative or whether one or the other of the brush sets is inoperative is immaterial because in either case the same outputs will appear at the terminals 161–164 connected to the inputs of the coincidence circuits 136.

It sometimes is desirable to lock some of the modules to accomplish repeat printing without need for recycling such modules. This is accomplished by a lock lever 183 (FIGS. 5 and 9) which is carried on a square shaft 184 having round ends 185 journaled in the elongated blocks 21 and extending outside the end plates 22. There is a finger 186 carried on one end of the shaft 184 and a finger 187 carried on the other end of the shaft 184. The lock lever 183 is shown in locking position in FIG. 9 engaging the underneath side of the reset finger 103 so that movement of the reset lever 108 out of engagement with the reset finger 103 does not cause resetting of the stopping latch pawl 75. As shown in FIG. 5, the lock lever 183 is wide enough to lock up three modules. Accordingly, when the lock lever 183 is in locking position, when a new reading is to be made and the solenoid 53 is energized all of the modules will go through their normal readout cycles, except those located in rod grooves 188 (FIG. 5) which are locked by the lock lever 183 when it is in its FIG. 9 position.

The lock lever 183 is held in its locking position in opposition to a spring 189, extending between a screw 190 in the base 20 and the finger 186, by means of a pawl finger 191 which is hooked over the end of the finger 186. The pawl finger 191 is exactly like and is mounted exactly like the pawl finger 48 shown in detail in FIGS. 6 and 7, flexure spring 192, bracket 193 and screws 194 (FIG. 5) being like flexure spring 50, bracket 51 and screws 52 (FIGS. 6 and 7), respectively, hereinbefore described. A solenoid 195 attached to an end plate 22 by means of a bracket 196 carries the bracket 193 and is connected to the pawl finger 191 in the same manner as the solenoid 53 is connected to its pawl finger 48 as hereinbefore described. When the solenoid 195 is deenergized, the pawl finger 191 rests upon a pin 197 extending from a side wall 22.

The lock lever 183 is moved out of its locking position in a clockwise direction as shown by the arrow adjacent the lever 183 in FIG. 9 by momentarily energizing the solenoid 195 which withdraws the pawl finger 191 from the finger 186, whereupon the spring 189 attached to the finger 186 pivots the finger 186 and thus the shaft 184 until the finger 187 engages a stop pin 198 (FIGS. 5 and 6) carried by a side plate 22. The respective unlocked modules then are free for a readout. However, all of such respective unlocked modules automatically are locked at the end of the next readout cycle. This is accomplished by the pin 116 (FIGS. 6 and 8) engaging the finger 187 and rotating it counterclockwise as viewed in FIG. 6 in opposition to the spring 189 (FIG. 5) so that the finger 186 (FIG. 5) engages and cams the pawl finger 191 upwardly until it passes the pawl finger 191 which then is urged by the flexure spring 192 into latching engagement with the finger 186. The pin 116 is shown in FIG. 6 in its home position ready for the next readout cycle.

In operation, when it is desired to accomplish repeat printing without recycling the modules in rod grooves 188, the lock lever 183 is permitted to remain in its locking position shown in FIG. 9, the rest of the modules being recycled by giving start signals to the solenoid 53. When it is desired to recycle the locked modules in rod grooves 188, the solenoid 195 is energized momentarily and the lock lever 183 is moved to its unlocked position, such modules remaining unlocked for only one cycle, since they are automatically relocked at the end of such cycle as described above.

In conclusion, it is pointed out that while the illustrated example constitutes a practical embodiment of my invention, I do not limit myself to the exact details shown, since modifications of the same may be undertaken without departing from the spirit of this invention.

Having described the invention, I claim:

1. A readout device comprising, in combination, a rotatable element to be positioned according to information in an electrical circuit, commutator means including a rotatable portion, a rotatable toothed-member directly gear connected to the element and to the commutator portion for driving them, and stopping means controlled by the commutator means and engageable with the teeth on the toothed-member for stopping the element in the position corresponding to the information.

2. A readout device according to claim 1 wherein the gear ratio between the toothed-member and the element is larger than 1:1.

3. A readout device according to claim 1 wherein the rotatable commutator portion has a plurality of like electrical patterns and the gear ratio between the toothed-member and the element and the number of duplications of commutator patterns corresponds.

4. A readout device according to claim 1 wherein a drum type slip clutch is provided for driving the toothed-member.

5. A readout device according to claim 1 wherein the rotatable commutator portion includes a plate provided with an electrical pattern and gear teeth on its periphery.

6. A readout device comprising, in combination, a rotatable element carrying a gear to be positioned according to information in an electrical circuit, commutator means including a rotatable portion carrying a gear, a rotatable toothed-member carrying a gear meshed with said gears for driving them, and stopping means controlled by the commutator means and engageable with the teeth on the toothed-member for stopping the element in the position corresponding to the information.

7. A readout device according to claim 6 wherein the gear ratio between the toothed-member and the element is larger than 1:1.

8. A readout device according to claim 6 wherein the rotatable commutator portion has a plurality of like electrical patterns for producing readouts through commutator rotations of substantially less than one revolution.

9. A readout device comprising, in combination, a rotatable element to be positioned according to information in an electrical circuit, a plurality of rotatable teeth operatively connected to the element, slip clutch means for rotating the teeth and thus the element, stopping means engageable with any one of the teeth for stopping the element in the position corresponding to the information, and commutator means having a part rotatable with the teeth for operating the stopping means as the element approaches the position corresponding to the information.

10. A readout device according to claim 9 wherein the rotatable element, rotatable teeth and rotatable commutator part are directly gear connected.

11. A readout device comprising, in combination, a rotatable element to be positioned according to information in an electrical circuit, a toothed-member for driving the rotatable element, stopping means engageable with the teeth on the toothed-member for stopping the rotatable element in the position corresponding to the information, and commutator circuit means having a commutator rotatable in synchronism with the element and having a plurality of like electrical patterns each operable for operating the stopping means as the rotatable element approaches the position corresponding to the information.

12. A readout device comprising, in combination, a rotatable element to be positioned according to information in an electrical circuit, a rotatable toothed-member for driving the rotatable element, stopping means engageable with the teeth on the toothed-member for stopping the toothed-member and thus the rotatable element in the position corresponding to the information, and commutator means having a part rotatable with the rotatable element and the toothed-member for operating the stopping means as the element approaches the position corresponding to the information, the rotatable element, member and commutator part being directly gear connected.

13. A readout device according to claim 12 wherein a drum type slip clutch rotates the toothed-member.

14. A readout device comprising, in combination, a rotatable element to be positioned according to information in an electrical circuit, a rotatable toothed-member directly gear connected to the rotatable element for driving it, slip clutch means for rotating the member, there being a 2:1 gear ratio between the member and the element, stopping means engageable with the teeth on the toothed-member for stopping the element in the position corresponding to the information, and commutator means having a rotatable part directly gear connected to the toothed-member for operating the stopping means as the element approaches the position corresponding to the information, the rotatable commutator part having duplicate electrical patterns each operable for operating the stopping means, there being a 1:1 gear ratio between the member and the commutator part.

15. A readout device comprising, in combination, a rotatable element to be positioned according to information in an electrical circuit, rotatable teeth gear-connected to the element, means for rotating the teeth, stopping means engageable with any one of the teeth for stopping the element in the position corresponding to the information, and circuit means having a rotatable part gear-connected to the teeth for operating the stopping means.

16. A readout device according to claim 15 wherein the teeth are carried by a member and slip clutch means is provided for driving the member.

17. A readout device comprising, in combination, a rotatable element to be positioned according to information in an electrical circuit, and drive means for the element including a rotatable member operatively connected to the element and defining an opening, and a slip clutch comprising a drum received in the opening and flexure spring means connecting the drum and the member, there being enough friction between the drum and the flexure spring means to cause the drum and the member to turn together as one while the path of movement of the member is unobstructed.

18. A readout device comprising, in combination, a rotatable element to be positioned according to information in an electrical circuit, a plurality of rotatable teeth operatively connected to the element, slip clutch means for rotating the teeth and thus the element, stopping means engageable with any one of the teeth for stopping the element in the position corresponding to the information, commutator means having a part rotatable with the teeth for operating the stopping means as the element approaches the position corresponding to the information, and selectively unlocked blocking means for preventing disengagement of the stopping means from a tooth, whereby operation of the slip clutch means does not rotate the teeth.

19. A readout device according to claim 18 having means for automatically locking the unlocked blocking means at the end of the readout cycle.

References Cited

UNITED STATES PATENTS

| | | | |
|---|---|---|---|
| 2,896,845 | 7/1959 | Hansen et al. | 340—347 |
| 3,136,989 | 6/1964 | Loudon | 340—347 |

MAYNARD R. WILBUR, *Primary Examiner.*

G. R. EDWARDS, *Assistant Examiner.*

U.S. Cl. X.R.

235—61.9